(12) United States Patent
Bush et al.

(10) Patent No.: US 9,970,665 B2
(45) Date of Patent: May 15, 2018

(54) HYBRID HEAT PUMP SYSTEM

(71) Applicant: Mitsubishi Electric US, Inc., Cypress, CA (US)

(72) Inventors: Joseph Bush, Suwanee, GA (US); So Nomoto, Suwanee, GA (US)

(73) Assignee: MITSUBISHI ELECTRIC US, INC., Cypress, CA (US)

( * ) Notice: Subject to any disclaimer, the term of this patent is extended or adjusted under 35 U.S.C. 154(b) by 439 days.

(21) Appl. No.: 14/848,602

(22) Filed: Sep. 9, 2015

(65) Prior Publication Data

US 2017/0067652 A1   Mar. 9, 2017

(51) Int. Cl.
| | |
|---|---|
| *F24D 11/02* | (2006.01) |
| *F24D 12/02* | (2006.01) |
| *F25B 30/06* | (2006.01) |
| *F24D 5/12* | (2006.01) |

(52) U.S. Cl.
CPC ............... *F24D 12/02* (2013.01); *F24D 5/12* (2013.01); *F25B 30/06* (2013.01); *F24D 11/0271* (2013.01); *F24D 2200/123* (2013.01); *Y02B 30/14* (2013.01)

(58) Field of Classification Search
CPC . F24D 12/02; F24D 2200/123; F24D 2200/12
See application file for complete search history.

(56) References Cited

U.S. PATENT DOCUMENTS

| | | | |
|---|---|---|---|
| 2004/0118933 A1* | 6/2004 | Readio | F24D 12/02 237/2 B |
| 2009/0255646 A1* | 10/2009 | Kodeda | F24D 3/18 165/45 |
| 2011/0100593 A1 | 5/2011 | Benz et al. | |
| 2011/0111688 A1* | 5/2011 | Tollar | F24F 7/02 454/238 |

* cited by examiner

*Primary Examiner* — Ljiljana Ciric
*Assistant Examiner* — Alexis Cox
(74) *Attorney, Agent, or Firm* — Posz Law Group, PLC (57) ABSTRACT

A heat pump system with a hybrid heating system is disclosed. The heat pump system includes a first housing comprising a heat exchanger, a compressor, and a fan. The heat pump system also includes a second housing that includes a supplemental heat source that is activated when the outside air falls below a certain temperature. The second housing includes a series of dampers that permit recirculation of the air passing through the first housing so that the supplemental heat source can provide heat to the recirculated air. The supplemental heat source increases the heating capacity of the heat pump system.

19 Claims, 14 Drawing Sheets

Optional Hot Water Coil Heated By External Source

Top View

Hybrid operation with supplemental heat source activated and showing airflow path
Outdoor air and discharge dampers are OPEN
Recirculation damper is CLOSED
Air is circulating and being heated by the gas fired heat exchanger

FIG. 12

HYBRID HEAT PUMP SYSTEM

TECHNICAL FIELD

The present disclosure relates generally to an improved heat pump system and particularly to a heat pump system with a hybrid heating mode.

BACKGROUND

Heat pump systems provide heating and cooling to enclosed spaces, such as buildings and homes. A heat pump system typically comprises an indoor unit that includes a heat exchanger coil and a fan and an outdoor unit that includes a heat exchanger coil, a fan, and a compressor. The heat pump system also typically includes multiple valves, such as an expansion valve and a reversing valve. The indoor unit and outdoor unit are typically linked by tubing that includes a refrigerant fluid. The reversing valve changes the direction in which the refrigerant fluid flows depending on the mode of operation so that the heat pump system can operate in a cooling mode to provide cooling to an enclosed space and can operate in a heating mode to provide heating to an enclosed space. In the cooling mode, the outdoor heat exchanger transfers heat from the refrigerant to the air circulating through the outdoor unit. In contrast, in the heating mode, the outdoor heat exchanger transfers heat from the air circulating through the outdoor unit to the refrigerant fluid.

The heating capacity of the heating mode becomes more limited as the outdoor temperature decreases because there is less heat available in the circulating air that can be transferred to the refrigerant. In climates with extremely cold temperatures, the heat pump may not have sufficient heating capacity to warm the enclosed space. In such cases, a backup heating system, such as an indoor electric heating system may be required. However, backup heating systems, such as an indoor electric heating system, add costs and may not be as efficient.

Therefore, in view of the limitations in existing heat pump systems, there is a need for a heat pump system that provides improved heating capacity in cold climates. There is a further need for a heat pump system that provides additional heating capacity efficiently and without the need to install a backup indoor heating system.

SUMMARY

In general, in one aspect of the present disclosure, an example outdoor unit of a heat pump system comprises a first housing comprising a fan, an outdoor heat exchanger coil, and a compressor in fluid communication with the heat exchanger coil. The example outdoor unit also comprises a second housing comprising a supplemental heat source, an inlet damper, a discharge damper, a recirculation damper, and a controller configured to manipulate the inlet damper, the discharge damper, and the recirculation damper.

In another aspect, the present disclosure describes an example apparatus for attaching to an outdoor unit of a heat pump system. The apparatus comprises a housing, the housing comprising a supplemental heat source, an inlet damper, a discharge damper, a recirculation damper, and a controller. The controller is configured to manipulate the inlet damper, the discharge damper, and the recirculation damper.

These and other aspects, objects, features, and embodiments will be apparent from the following description and the appended claims.

BRIEF DESCRIPTION OF THE DRAWINGS

The drawings illustrate only example embodiments of the disclosure and are therefore not to be considered limiting of its scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, apparatuses, and methods for heat pump systems used to heat and cool enclosures. Those of skill in this field will recognize that the examples provided herein are not limiting and alternate embodiments can be implemented within the scope of the present disclosure. Those of skill in the field will also recognize that conventional components known in the art are not included in the figures so as not to obscure the example embodiments. Furthermore, those of skill in the field will recognize that the example embodiments shown in the figures are intended to be illustrative and that the components can be modified and arranged differently in alternate embodiments without departing from the scope of the present disclosure.

Like, but not necessarily the same, elements (also sometimes called components) in the various figures are denoted by like reference numerals for consistency. Terms such as "first," "second," "top," and "bottom" are used merely to distinguish one component (or part of a component) from another. Such terms are not meant to denote a preference or a particular orientation. Unless otherwise noted, the term "temperature" as used herein refers to a dry-bulb temperature (e.g., ° F.DB).

Figure 1A:
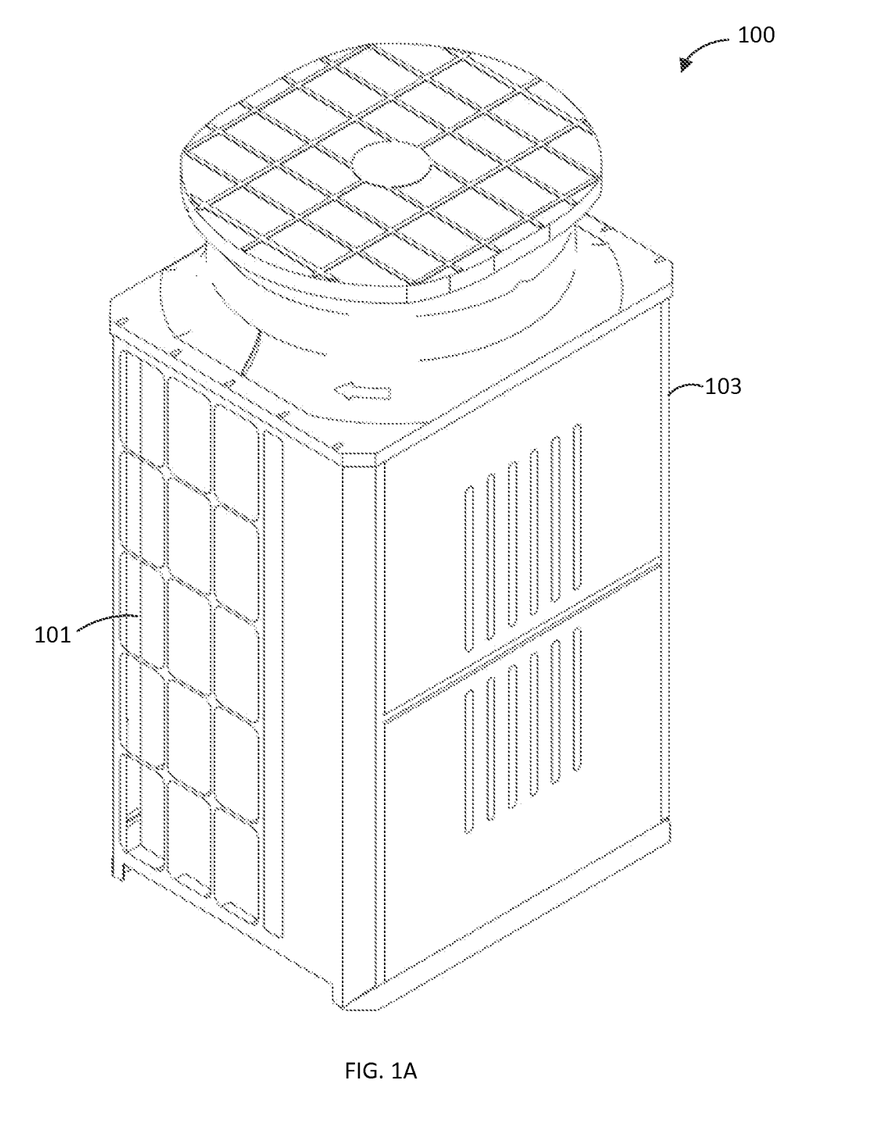
FIG. 1A illustrates a perspective view of an outdoor unit of a heat pump system in accordance with an example embodiment of the present disclosure
Figure 1B:
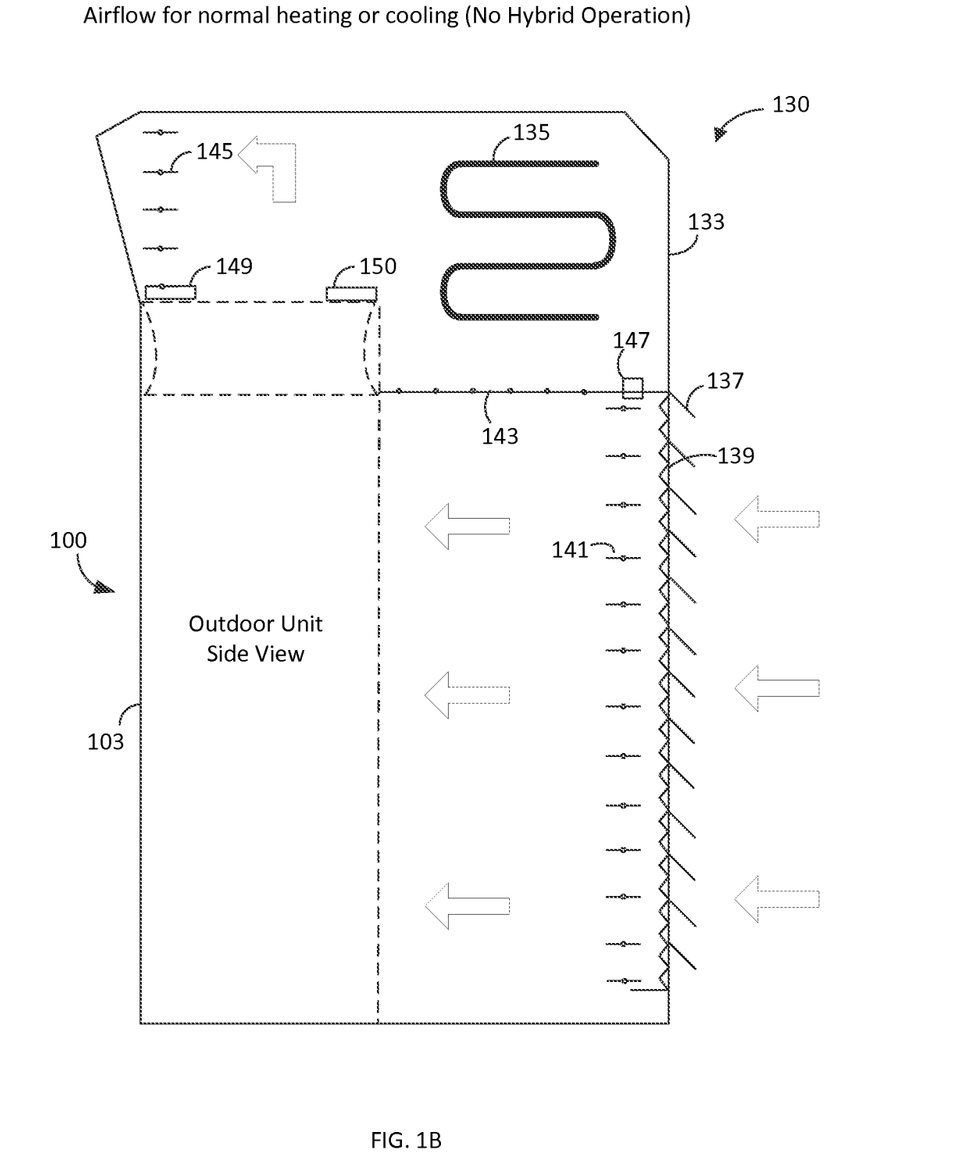
FIG. 1B illustrates a cross-section side view schematic diagram of an outdoor unit of a heat pump system in accordance with an example embodiment of the present disclosure.

Referring now to FIG. 1A, a perspective view of an outdoor unit 100 of a heat pump system is shown. FIG. 1B provides a side cross-section view of the outdoor unit 100 of a heat pump system with an attached supplemental heat source apparatus 130 in accordance with an example embodiment of the present disclosure. FIG. 1B illustrates the operation of an example outdoor unit 100 in a normal heating or cooling mode in which the supplemental heat source is not activated. Although the internal components of the outdoor unit 100 are not shown in FIG. 1B, outdoor unit 100 comprises a first housing 103 that typically contains a fan, a compressor, and a heat exchanger coil containing a refrigerant fluid. In a typical heat pump system, the heat exchanger coil and compressor are coupled to tubing that supplies the refrigerant fluid to an indoor unit of the heat pump system.

The supplemental heat source apparatus 130, shown attached to the outdoor unit 100 in FIG. 1B, provides the capability for operating in a hybrid mode where a supplemental heat source is activated. The supplemental heat source apparatus 130 comprises a second housing 133 attached to the first housing 103. The second housing 133 comprises louvres 137 and a filter or screen 139 at the area where air enters the second housing 133. The louvres 137 assist in keeping snow and ice off the internal components of the second housing 133. Also located in this area is an inlet damper 141. The inlet damper 141 comprises a series of panels that can be rotated to control the flow of air into the second housing 133. As shown in FIG. 1B, the inlet damper 141 is in the open position to permit air to flow into the second housing 133.

Proximate to the inlet damper 141 is a recirculation damper 143. Similar to the inlet damper, the recirculation damper 143 comprises a series of panels that can be rotated between an open and closed position to control the flow of air within the second housing 133. As shown in FIG. 1B, the recirculation damper 143 is in the closed position. In the example embodiment shown in FIG. 1B, the recirculation damper 143 and the inlet damper 141 are controlled by a motor 147. The motor 147 is controlled by a controller 150 and the motor causes the panels of the recirculation damper 143 and the inlet damper 141 to rotate between the open and closed positions.

The second housing 133 also comprises a discharge damper 145 located at the point where air exits the second housing. The discharge damper 145 is similar to the dampers previously discussed and controls the flow of air exiting the second housing 133. In the example embodiment shown in FIG. 1B, the discharge damper 145 is controlled by motor 149. It should be readily understood that in alternate embodiments, the three dampers may be arranged in other configurations and may be controlled by more or fewer than the two motors shown in the example of FIG. 1B.

The second housing 133 further comprises a supplemental heat source 135. The example provided in FIG. 1B shows the outdoor unit 100 and the supplemental heat source apparatus 130 operating in a normal heating or cooling mode where the supplemental heat source 135 is not activated. The arrows shown in FIG. 1 illustrate the flow of air through the system. In the normal heating or cooling mode, air enters the second housing 130 through the louvres 137, the filter or screen 139, and the open inlet damper 141. The air passes into the outdoor unit 100 where the air heats or cools an outdoor heat exchanger coil containing a refrigerant fluid. A fan located in the outdoor heat exchanger unit 100 directs the air upward and the air exits the second housing 133 through the discharge damper 145. In the normal heating or cooling mode, the air is not directed towards the supplemental heat source 135. The operation of the supplemental heat source 135 will be described in greater detail in connection with FIG. 6.

Figure 2:
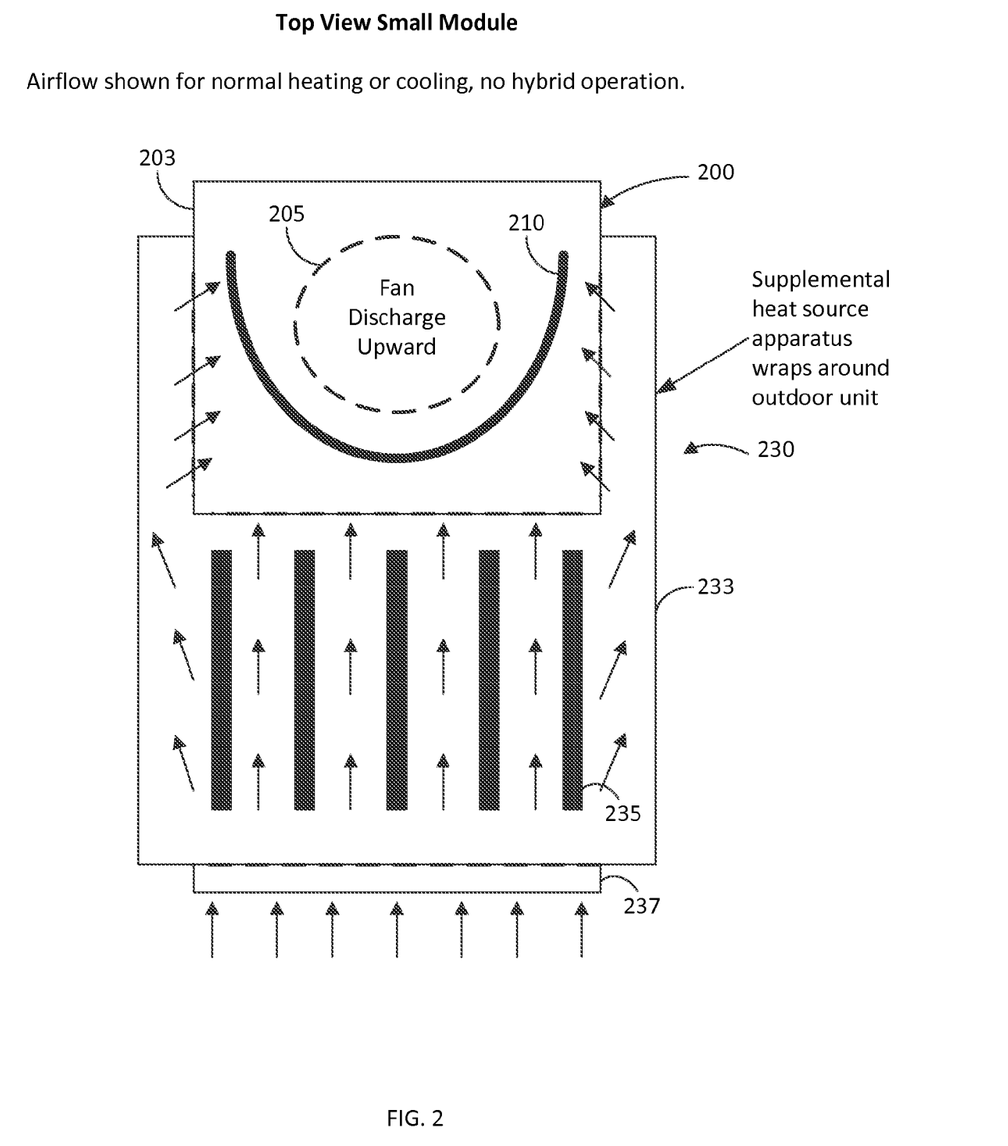
FIG. 2 illustrates a cross-section top view schematic diagram of an outdoor unit of a heat pump system in accordance with an example embodiment of the present disclosure.

FIG. 2 illustrates an example outdoor unit 200 and supplemental heat source apparatus 230 in accordance with the embodiments described herein. Reference numbers in FIG. 2 with the same last two digits as the reference numbers in FIGS. 1A and 1B indicate the component in FIG. 2 is similar to the component in FIGS. 1A and 1B and thus, a detailed description of the component will not be repeated. The same numbering convention applies in each of the Figures accompanying this application and descriptions for similar or corresponding components will not be repeated with each Figure.

The top view shown in FIG. 2 illustrates a fan 205 and heat exchanger coil 210 located within the first housing 203 of the outdoor unit 200. The example in FIG. 2 also shows a supplemental heat source 235 within second housing 233. FIG. 2 also provides a top view illustration of the flow of air, represented by arrows, through the system when running in the normal heating or cooling mode without activating the supplemental heat source 235. As shown in FIG. 2, air enters through the louvres 237, passes through the second housing 233 and into the first housing 203. As the air passes through the second housing 233, it is passing below the supplemental heat source 235, similar to the flow shown in FIG. 1B.

As shown in FIG. 2, the second housing 233 includes extension portions that extend along the sides of the first housing 203 in order to cover the inlet openings along the sides of the first housing 203 (such as inlet openings 101 shown in FIG. 1A). As shown by the arrows in FIG. 2, the extension portions of the second housing 233 direct the air flow from the second housing 233 and into the first housing 203. Covering the inlet openings in the first housing 203 and directing the air flow into the first housing 203 is an important aspect of the air recirculation that will be described in connection with the supplemental heat source 235 in FIG. 6.

Similar to the air flow described in connection with FIG. 1B, the air flow in FIG. 2 warms or cools the heat exchanger coil 210 and then is directed upward (out of the page in the top view of FIG. 2) by the fan 205. Because the example system shown in FIG. 2 illustrates a normal cooling or heating mode without supplemental heating, after being directed upward, the air exits through a discharge damper (not shown).

Figure 3:
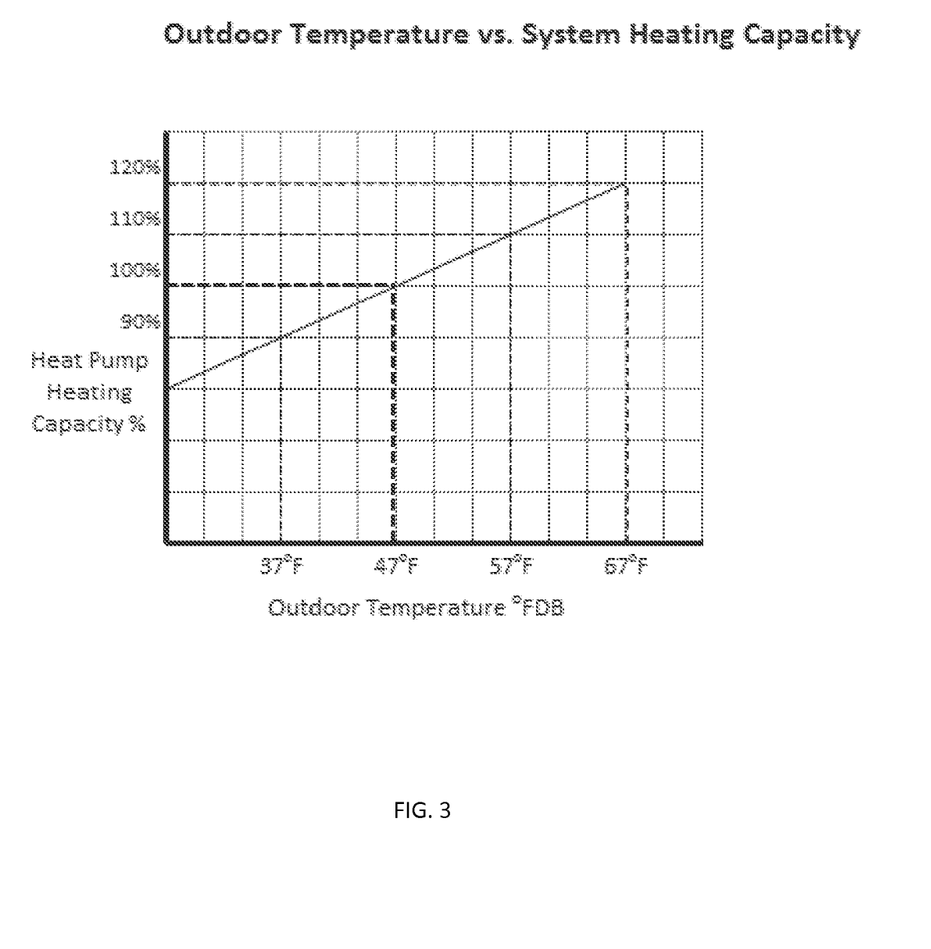
FIG. 3 is a diagram illustrating heating capacity of a heat pump system in accordance with an example embodiment of the present disclosure.

FIG. 3 provides a diagram illustrating the heating capacity of a heat pump system in accordance with an example embodiment of the present disclosure. FIG. 3 will be described in greater detail below in connection with the hybrid operating mode illustrated in FIG. 6.

Figure 4:
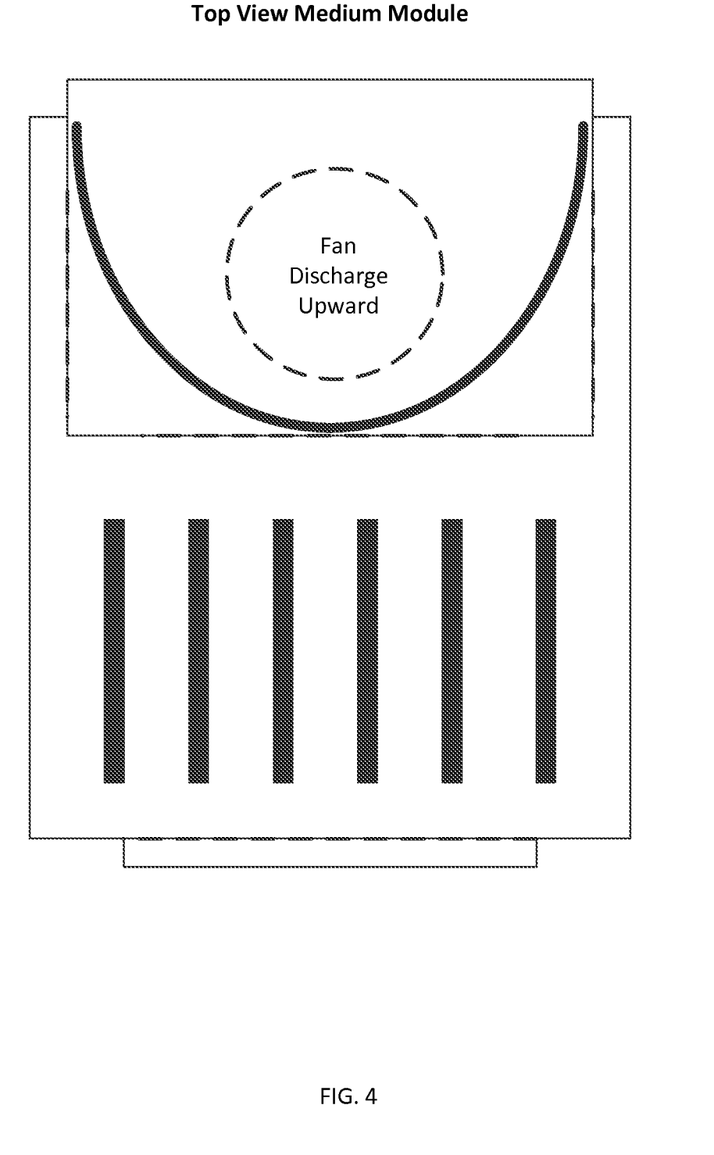
FIGS. 4 and 5 illustrate cross-section top view schematic diagrams of an outdoor unit of a heat pump system in accordance with two example embodiments of the present disclosure.
Figure 5:
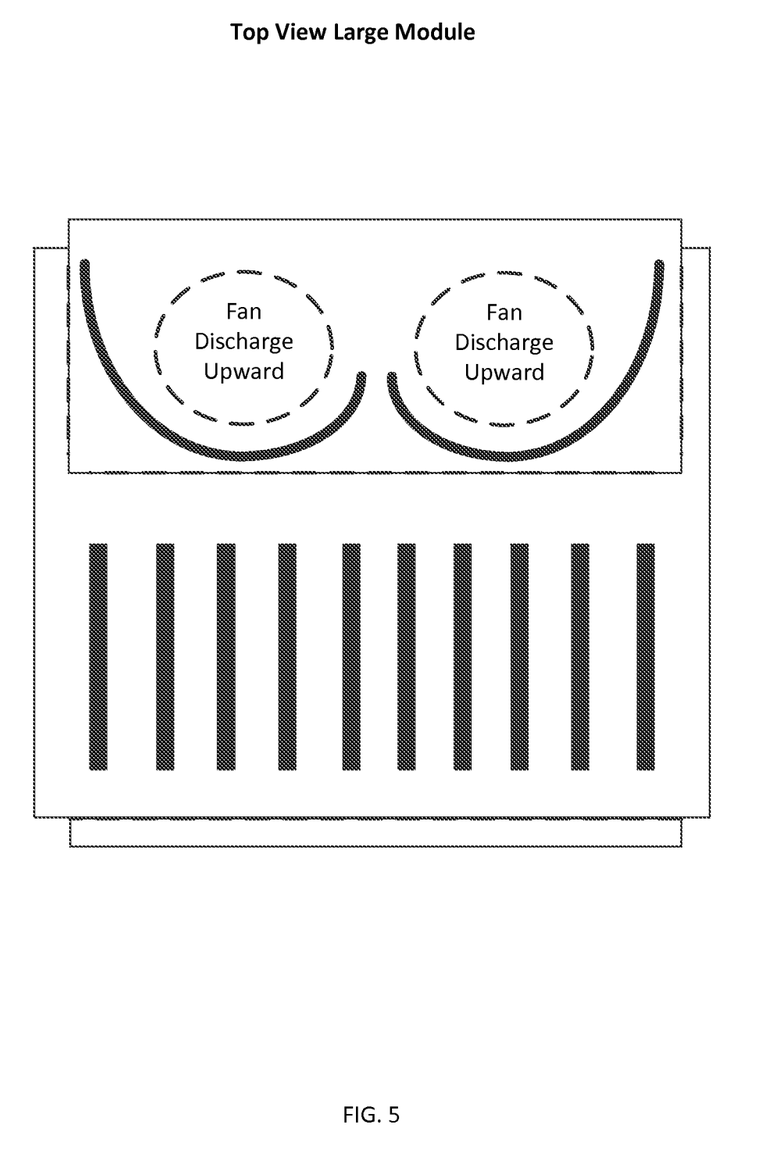

FIGS. 4 and 5 illustrate different non-limiting examples of outdoor units which can be implemented with a supplemental heat source apparatus. The majority of the components of the example embodiments shown in FIGS. 4 and 5 are similar to those described in connection with FIGS. 1B and 2 and will not be repeated. One difference between the example shown in FIG. 2 and the examples in FIGS. 4 and 5 is the capacity of each unit. For example, the supplemental heat source 235 in the small module shown in FIG. 2 comprises five tubes, whereas the medium and large modules in FIGS. 4 and 5 have supplemental heat sources with a greater number of tubes and greater heating capacity. It should be understood that the examples provided in FIGS. 4 and 5 are non-limiting and alternate embodiments may comprise outdoor units and supplemental heat sources with different dimensions or specifications. The following are representative calculations with respect to different sizes of the supplemental heat source that can be implemented with the embodiments described herein.

Figure 6:
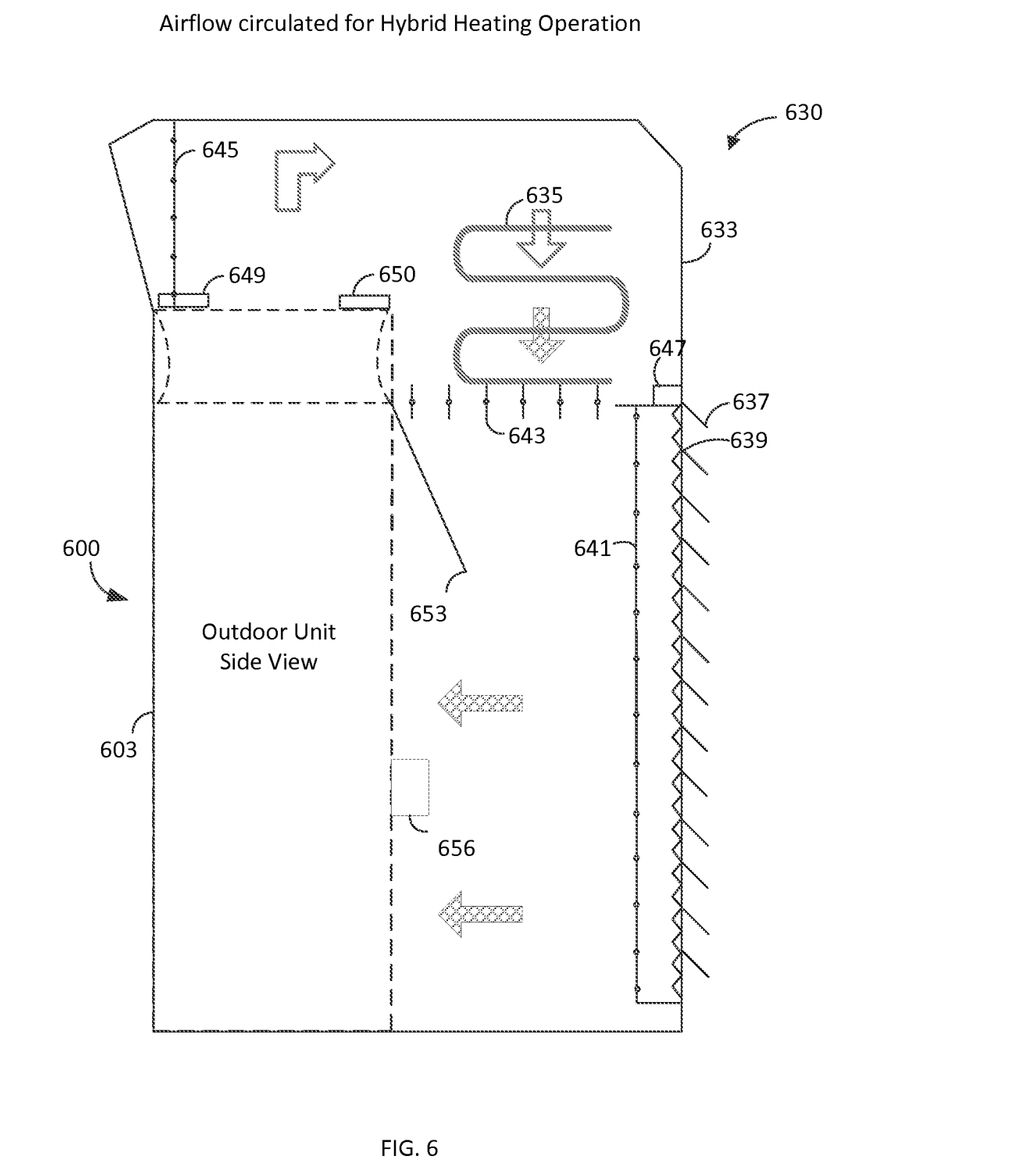
FIG. 6 illustrates a cross-section side view schematic diagram of an outdoor unit of a heat pump system in accordance with an example embodiment of the present disclosure.

Although the example shown in FIG. 6 illustrates the supplement heat source 635 above the recirculation damper 643, in alternate embodiments, the supplemental heat source can be located in other positions. For example, the supplemental heat source 635 can be positioned below the recirculation damper 643 or directly above the outdoor unit 600.

The recirculating air flow within the first housing and the second housing during the hybrid heating mode can be optimized using one or more of a variety of techniques. For example, in order to maximize the efficiency of the system, it is preferable that the air flowing through the recirculation damper 643 continue to flow towards the bottom of the second housing 633 so that the warmed air is distributed evenly as it enters the outdoor unit 600. The air flow can be optimized by adding an optional baffle 653 that extends downward from the recirculation damper and directs the air towards the bottom of the second housing 633. Alternatively, the rotating panels of the recirculating damper 643 can be rotated so that they are angled relative to the vertical position shown in FIG. 6 thereby directing the air at an angle toward the bottom corner of the second housing 633 that is farthest from the outdoor unit 600.

TABLE 1

| Outdoor Unit Module Size | 1. Standard heating capacity BTUH | | 2. Subtract heat of compression BTUH | | 3. Increased heating capacity in Hybrid mode | | 4. Required Hybrid Heat BTUH | | 5. Gas Heater Input Adjustment | | 6. Gas heater Input size BTUH |
|---|---|---|---|---|---|---|---|---|---|---|---|
| Small Module | 80,000 | − | 15,149 | × | 1.20 | = | 77,821 | / | 0.80 | = | 97,277 |
| Medium Module | 108,000 | − | 21,837 | × | 1.20 | = | 103,396 | / | 0.80 | = | 129,245 |
| Large Module | 188,000 | − | 42,889 | × | 1.20 | = | 174,133 | / | 0.80 | = | 217,667 |

1. Standard heating capacity per module size @47° FDB/43° FWB Outdoor air temperature. Considered 100% Heating Capacity with standard heat pump operation.
2. Heat of compression is compressor heat added into the system. This is removed since it is provided even when the hybrid heat is operating.
3. This factor adjusts the heating requirement to provide 120% heating when operating in hybrid mode.
4. This is the amount of heat output required by the hybrid heating source to provide 120% system capacity. Use this BTUH for hot water or electric heat sizing.
5. This factor adjusts the heating amount assuming the hybrid heating source is an 80% efficient gas heater
6. Gas heater input size based on 80% efficient heater Referring to FIG. 6, an example embodiment is illustrated showing the activation of the supplemental heat source. As explained above, similar or corresponding components are identified where the last two digits of the reference numbers shown in FIG. 6 match the last two digits of the reference numbers shown in FIG. 1B. A detailed description of these similar or corresponding components will not be repeated.

The air flow illustrated by the arrows in FIG. 6 indicates that the system has switched from a normal heating mode to a hybrid heating mode where the supplemental heat source 635 is activated and supplies additional heat. As with the normal heating mode, air within the outdoor unit 600 is directed upward by a fan (not shown in FIG. 6) located within the first housing 603. However, in the hybrid heating mode, the controller has activated the motors 647 and 649 to adjust the dampers. Specifically, the motors have closed the discharge damper 645 and the inlet damper 641, but opened the recirculation damper 643. The resulting effect of the changed position of the dampers is that, instead of the air exiting the second housing 633 through the discharge damper 645, the air flow is recirculated through the second housing 633 and through the supplemental heat source 635. As the air passes through the supplemental heat source 635, it absorbs heat and then flows down through the recirculation damper 643, through the bottom portion of the second housing, and back into the first housing 603 of the outdoor unit 600. In the outdoor unit 600, the warmed air can transfer heat to the heat exchanger coil (not shown), ultimately providing additional heat to the enclosure that is being heated by the heat pump system.

Figure 7:
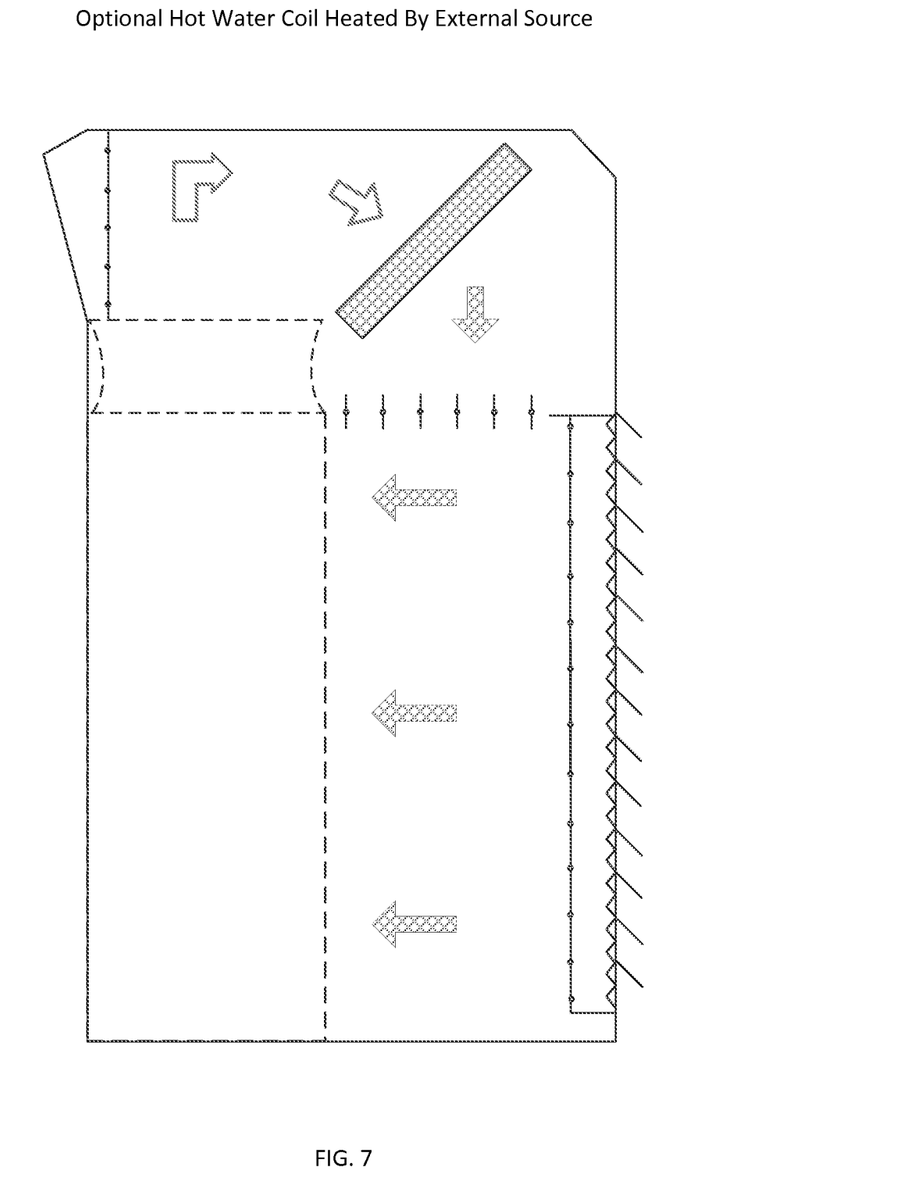
FIGS. 7 and 8 illustrate cross-section side view schematic diagrams of an outdoor unit of a heat pump system in accordance with two example embodiments of the present disclosure.
Figure 8:
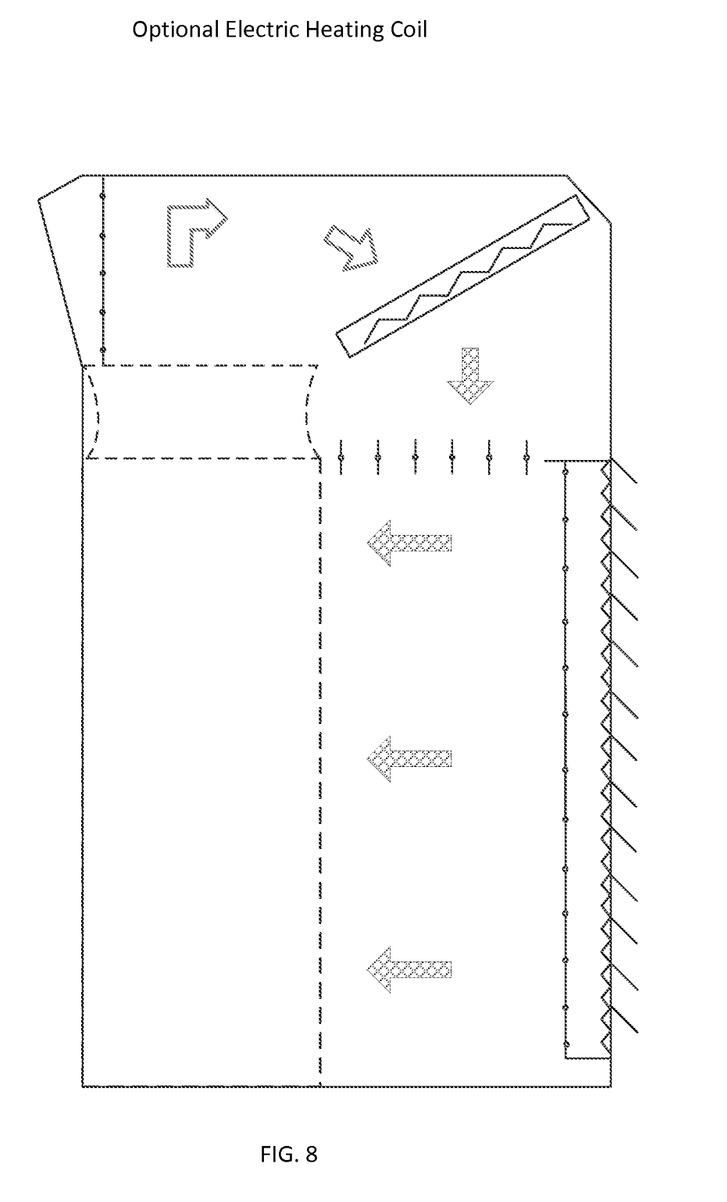

The supplemental heat source 635 can be implemented in a variety of forms. In one example, the supplemental heat source can be a gas heater. FIGS. 7 and 8 illustrate alternate embodiments where the components are similar to those shown in FIG. 6, but with alternate supplemental heat sources. As illustrated in FIGS. 7 and 8, in other embodiments, the supplemental heat source can be implemented as an electric heating coil or as a hot water coil heated by external sources, such as a boiler, geothermal source or waste heat from another source.

Referring again to FIGS. 1 and 6, the combined system of the outdoor unit 100, 600 and the supplemental heat source apparatus 130, 630 can be controlled by a controller 150, 650. The controller 150, 650 can be configured to turn the supplemental heat source 135, 635 on and off, to modulate the supplemental heat source, and to control the motors 147, 149, 647, 649 that operate the dampers. The controller 150, 650 also can receive measurements from a temperature sensor 656 that measures the temperature of the air flowing into the first housing 103. During cold periods when the temperature of the outdoor air flowing through the first housing 103 falls below a preset threshold, the controller can switch the system from the normal heating mode illustrated in FIG. 1 to the hybrid heating mode illustrated in FIG. 6. As described above, in the hybrid heating mode the supplemental heat source 635 is activated and the dampers change position so that air is recirculated through the supplemental heat source 635. The controller 150, 650 can be programmed so that the heat pump system continues to operate in the hybrid heating mode until the outdoor air temperature rises above the preset threshold or until the entire heat pump system turns off. While operating in the hybrid heating mode, the controller 150, 650 keeps the dampers in the position shown in FIG. 6 so that air continues to recirculate through the first housing 603 and the second housing 633. Also while operating in the hybrid heating mode, the controller 150, 650 can modulate the supplemental heat source 635 to maintain a target temperature for the air entering the first housing 603. The controller 150, 650 can modulate the supplemental heat source 635, for example, using a temperature actuated valve to adjust an input (e.g., gas, electricity, geothermal heat) to the supplemental heat source 635. As the demand for heat for the structure being heated by the heat pump system changes, the demand for heat from the outdoor unit 600 changes and the controller 150, 650 also can modulate the supplemental heat source 635.

The controller 150, 650 can be implemented as a single component or multiple components and can include a hardware processor-based component that executes software instructions using integrated circuits, volatile and non-volatile memory for storing software instructions and other input, network and communications interfaces, and/or other mechanical and/or electronic architecture. The controller 150, 650 can coordinate the operation of the supplemental heat source apparatus 130, 630 and can receive information and instructions from the outdoor unit 100, 600. For example, the controller 150, 650 can generate and send instructions, receive information (e.g., data), perform calculations, perform evaluations, compare measured or calculated values against set or threshold values, generate and send notifications, control devices, send information (e.g., data), receive instructions, follow commands, and communicate with other devices. In addition, or in the alternative, the controller 150, 650 can include one or more of a number of other programmable components. The controller 150, 650 can be programmed or controlled via a user interface. The user interface can be mounted within or on the second housing 133, 633 or can be mounted separately within the indoor environment that is being heated.

With the supplemental heat source apparatus 130, 630, the outdoor unit 100, 600 has an increased heating capacity. One advantage accompanying the additional heat provided to the recirculating air is that the heat exchanger coil in the outdoor unit 100, 600 is maintained at a warmer temperature and the compressor in the outdoor unit 100, 600 can operate at a higher frequency while remaining within a safe compression ratio range. For example, with the compressor operating at a higher frequency, the heating capacity of the heat pump can be increased by as much as 120% or more of its nominal rated capacity.

FIG. 3 provides a diagram illustrating the relationship between the outdoor temperature and the heating capacity of the heat pump system. The typical outdoor temperature rating point for a heat pump is 47° F.DB and this temperature corresponds to 100% heating capacity. When using the supplemental heating source and recirculating the air within the outdoor unit 100, 600, the temperature can be maintained above 47° F.DB. Maintaining an elevated temperature within the outdoor unit 100, 600 allows the heat pump system to provide more than the standard 100% heating capacity. As illustrated in FIG. 3, maintaining an approximate temperature of 67° F.DB within the outdoor unit 100, 600, the heat pump system can provide 120% or more heating capacity to the enclosed space being heated.

Another advantage of the supplemental heat source apparatus 130, 630 is that it eliminates the need to turn off the heating mode of the outdoor unit 100, 600 to operate in a defrost mode. The typical operation of an outdoor unit in a heat pump system requires turning off the heating mode periodically to activate a defrost mode. The defrost mode is typically required to remove accumulated ice on the heat exchanger of the outdoor unit 100, 600. The defrost mode is inefficient for the overall heating process because it requires that the outdoor unit 100, 600 be switched out of heating mode and operate in a reverse cycle via the reversing valve.

The embodiments described herein can avoid the inefficiencies associated with interrupting the heating mode to switch to a defrost mode. In the embodiments described herein, the controller 150, 650 can be programmed to switch periodically from the normal heating mode to the hybrid heating mode. The additional heat provided by the supplemental heat source 135, 635 during the hybrid heating mode can be used to remove ice that accumulates on the heat exchanger of the outdoor unit 100, 600. Accordingly, the inefficiency associated with interrupting the heating mode to switch to the defrost mode can be eliminated from the heating process and replaced with the more efficient hybrid heating mode.

Figure 9A:
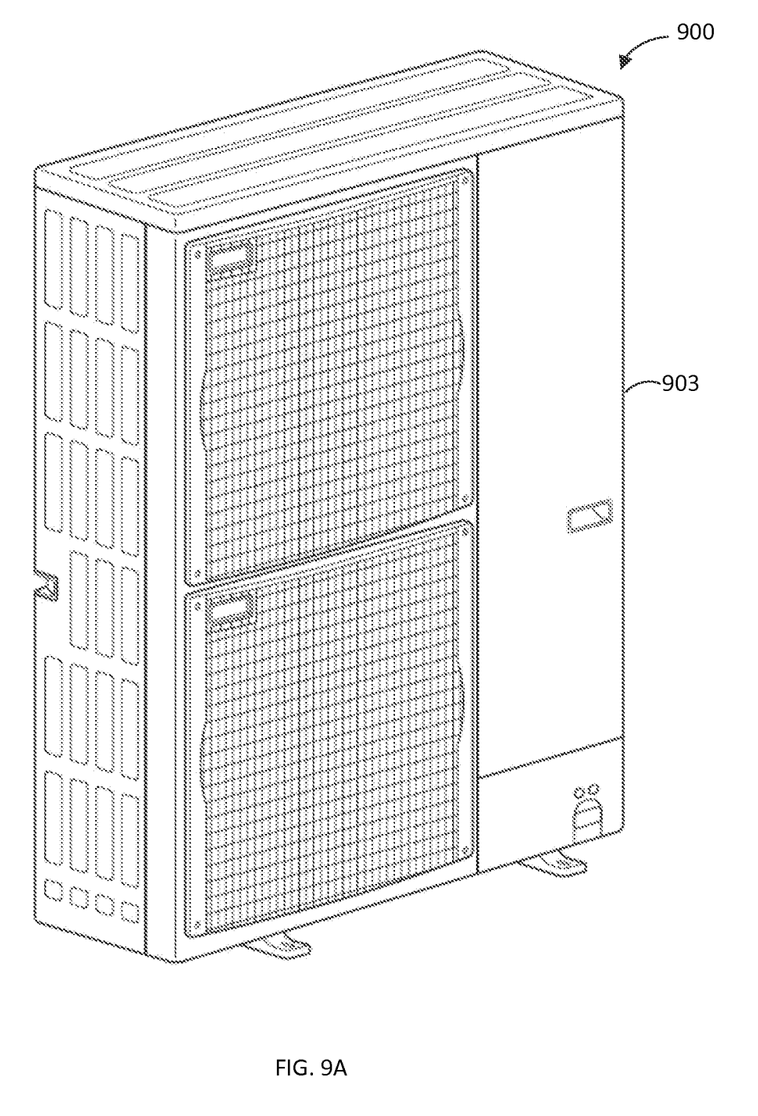
FIG. 9A illustrates a perspective view of an outdoor unit of a heat pump system in accordance with an example embodiment of the present disclosure.
Figure 9B:
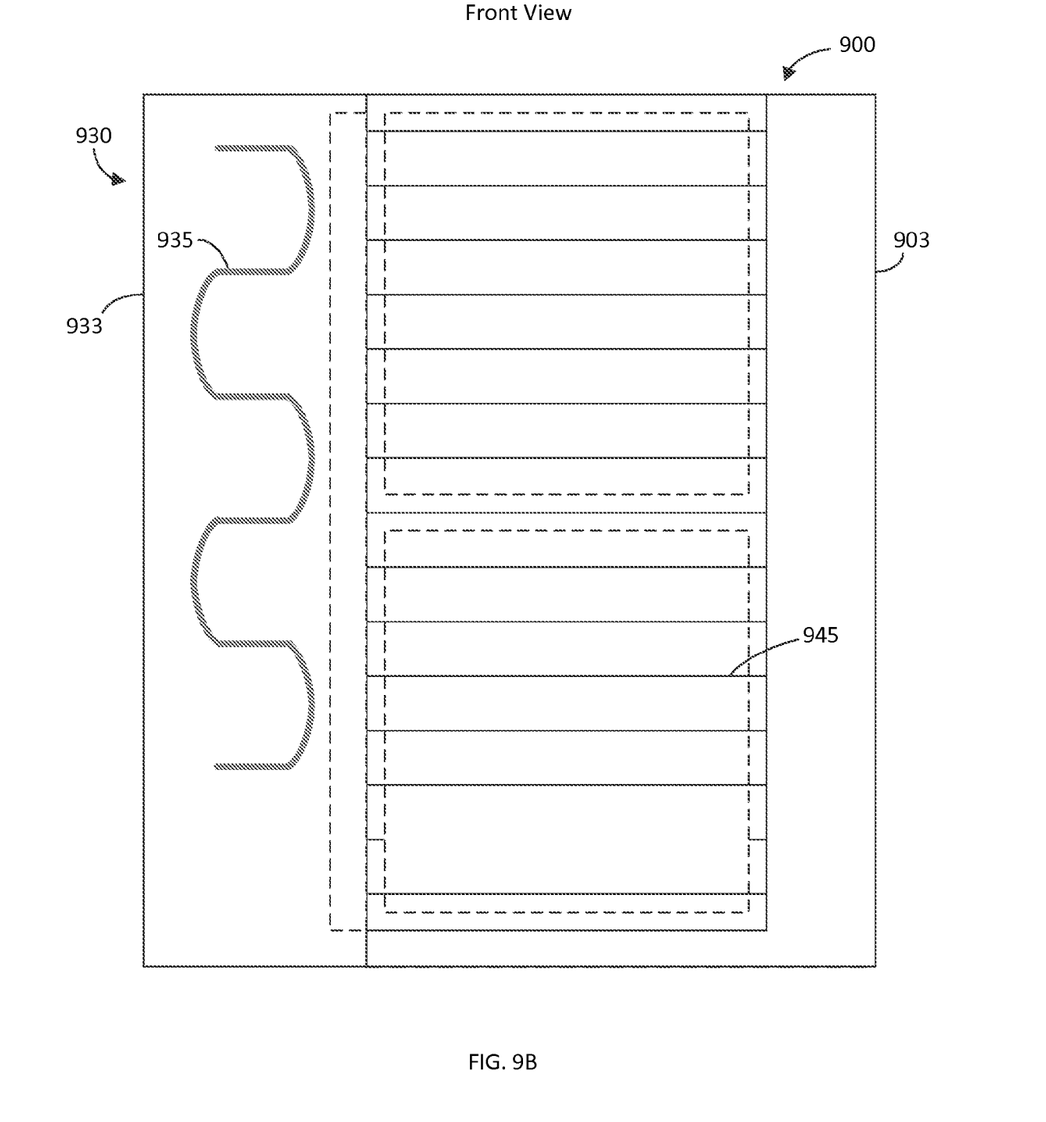
FIG. 9B illustrates a cross-section front view schematic diagram of an outdoor unit of a heat pump system in accordance with an example embodiment of the present disclosure.
Figure 10:
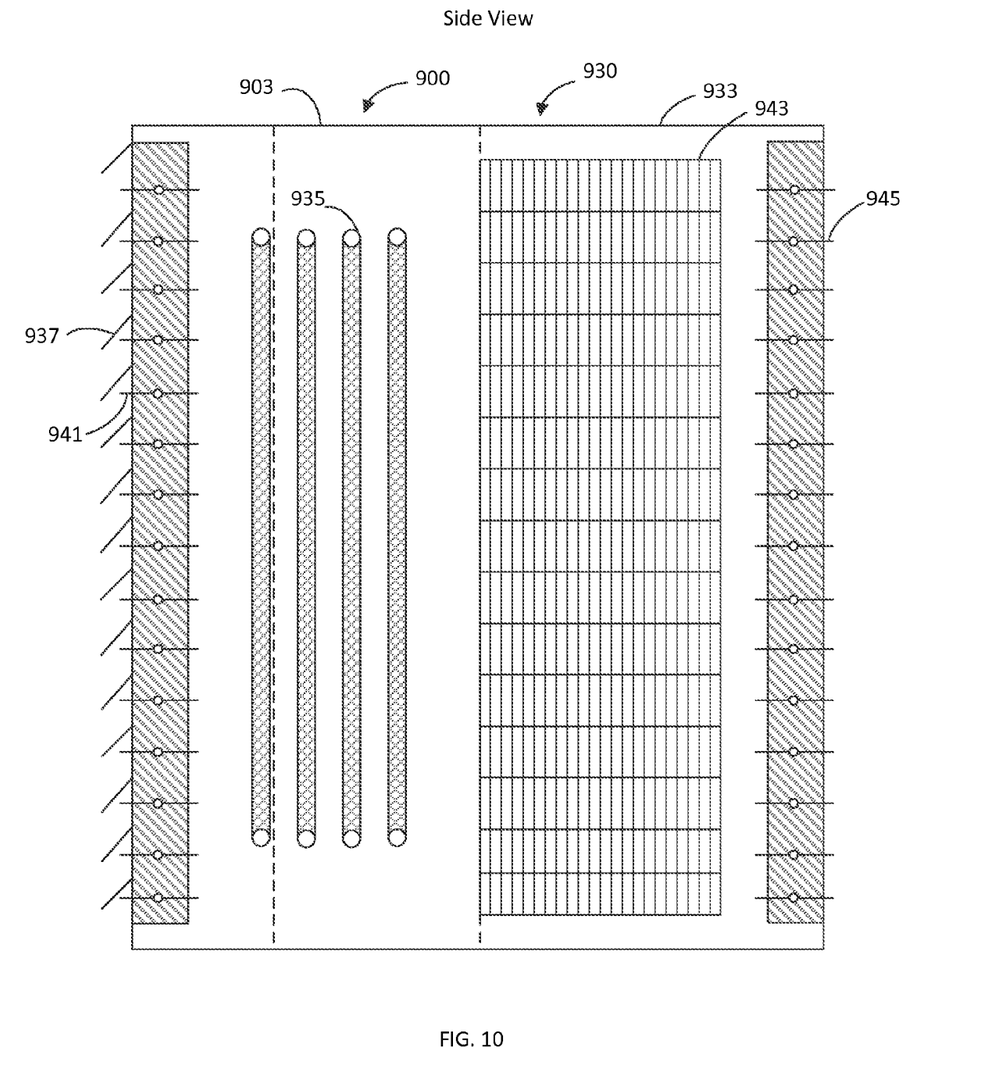
FIG. 10 illustrates a cross-section side view schematic diagram of an outdoor unit of a heat pump system in accordance with an example embodiment of the present disclosure.

Referring now to FIGS. 9A, 9B, 10, 11 and 12, an alternate embodiment of the combined outdoor system is illustrated. FIG. 9A provides a perspective view of an outdoor unit 900 used in a ductless heat pump system in accordance with the alternate embodiment. FIGS. 9B and 10 provide front and side views, respectively, showing that the supplemental heat source 935 is mounted at the side of the outdoor unit 900, instead of above the outdoor unit as shown in FIGS. 1 and 6. Similar to the previous example embodiments, the alternate embodiment shown in FIGS. 9B-12 includes the outdoor unit 900 which comprises a first housing 903 that contains a fan, a compressor, and an outdoor heat exchanger coil. The alternate embodiment shown in FIGS. 9B-12 also includes a supplemental heat source apparatus 930 comprising a second housing 933 that includes louvres 937, an inlet damper 941, a recirculation damper 943, and a discharge damper 945.

Figure 11:
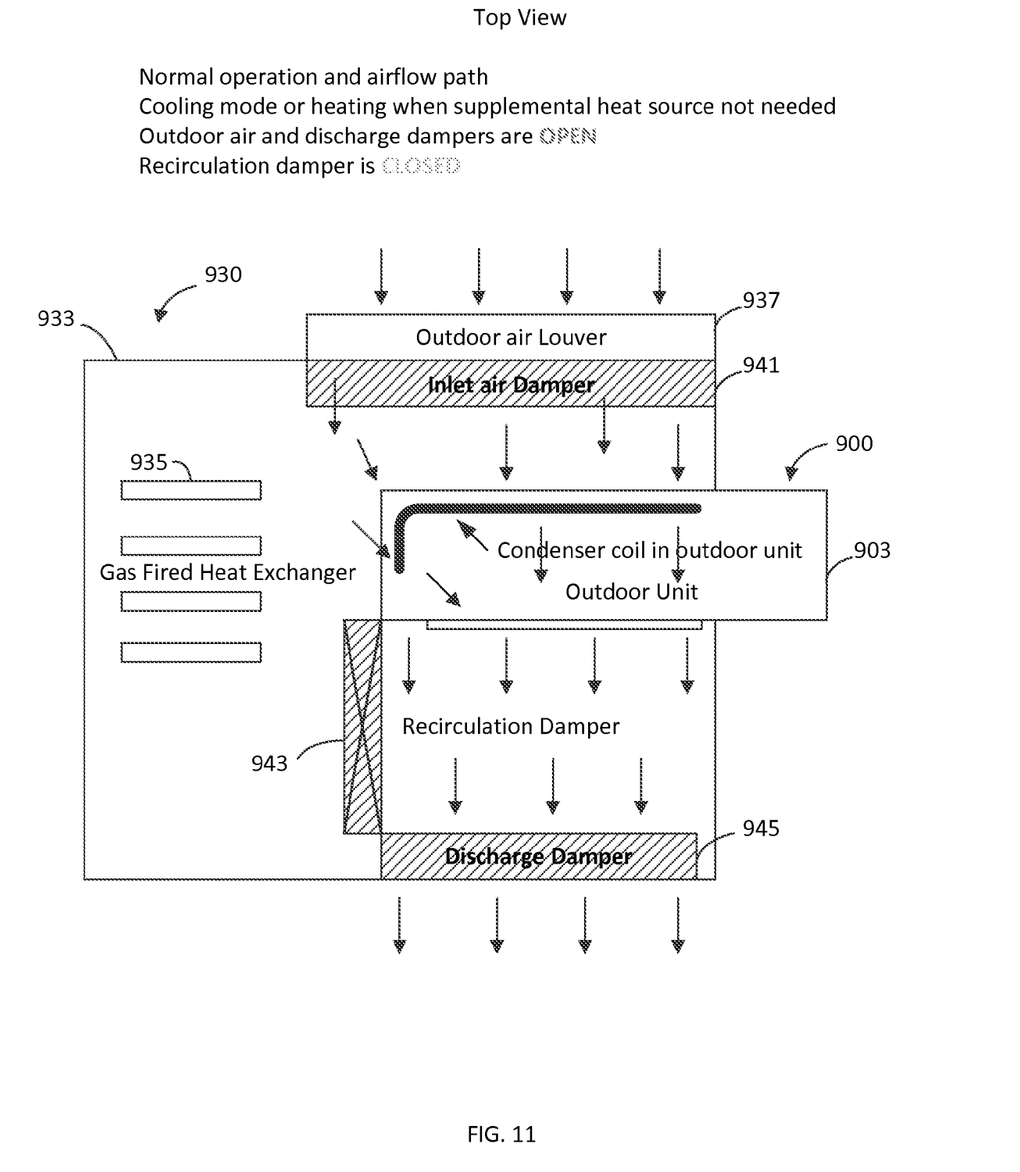
FIG. 11 illustrates a cross-section top view schematic diagram of an outdoor unit of a heat pump system in accordance with an example embodiment of the present disclosure.

FIG. 11 provides a top view of the alternate embodiment showing the air flow through the system when the supplemental heat source apparatus 930 is in the inactive state and the heat pump system is operating in a normal heating or cooling mode. Air enters the second housing 933 through the louvres 937 and the inlet damper 941 and then flows into the outdoor unit 900 where it warms or cools the outdoor heat exchanger coil. A fan within the first housing 903 directs the air towards the discharge damper 945 where it exits the apparatus.

Figure 12:
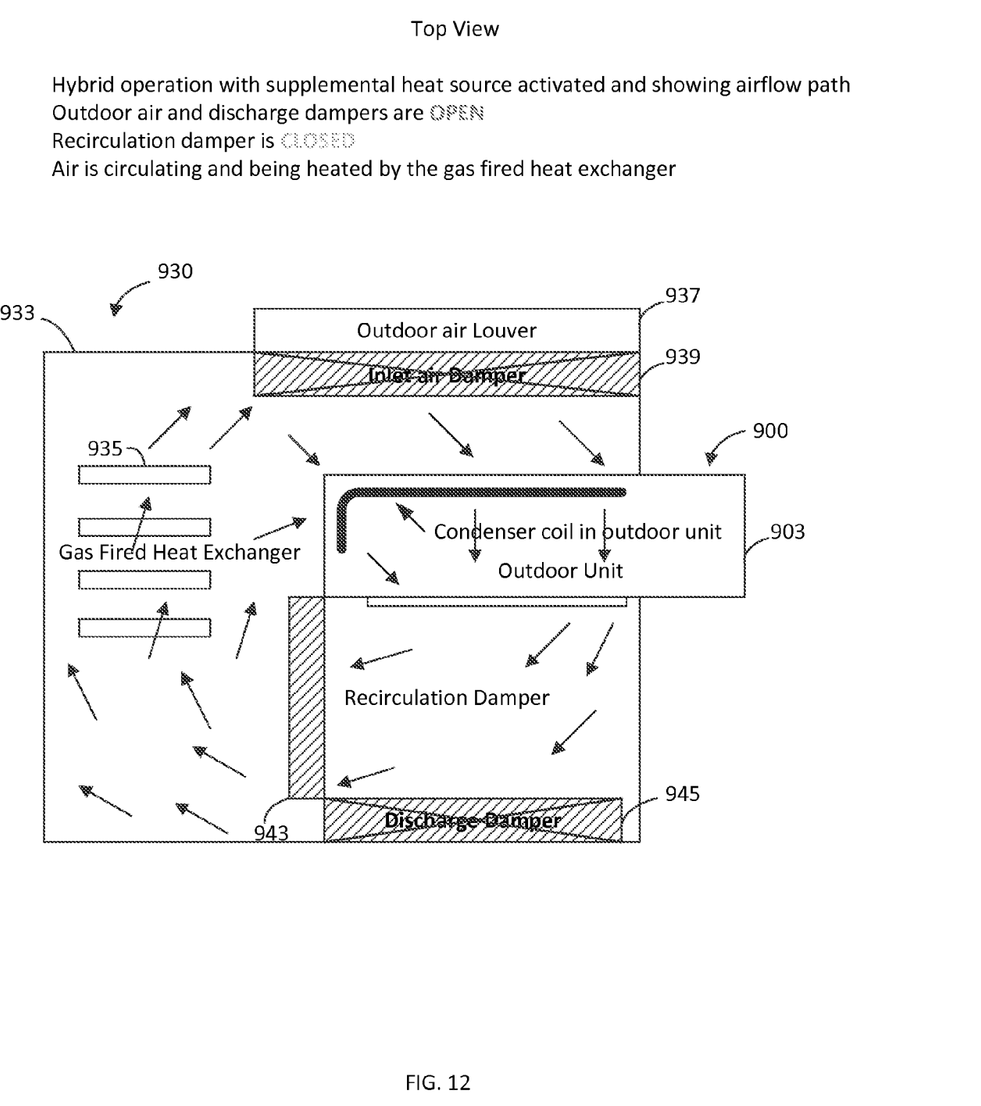
FIG. 12 illustrates a cross-section top view schematic diagram of an outdoor unit of a heat pump system in accordance with an example embodiment of the present disclosure.

In contrast, FIG. 12 provides a top view of the alternate embodiment where the supplemental heat source apparatus 930 is in the active or hybrid heating mode and shows the air flow recirculating through the second housing 933 and the supplemental heat source 935. The active or hybrid heating mode may be activated when a temperature sensor senses the temperature of the outdoor air entering the outdoor unit 900 is below a certain threshold. Alternatively, the active or hybrid heating mode may be activated periodically to clear ice that has accumulated on the heat exchanger of the outdoor unit 900. When the hybrid heating mode shown in FIG. 12 is activated, a controller closes the inlet damper 939 and the discharge damper 945, while also opening the recirculation damper 943. Changing the positions of the dampers causes the air to recirculate within the second housing 933 and to pass through the supplemental heat source 935. The controller also charges or activates the supplemental heat source 935 in order to deliver heat to the recirculating air. The recirculating air delivers the heat from the supplemental heat source 935 to the heat exchanger located within the first housing 903.

As with the heat pump system described in connection with FIG. 6, the controller can modulate the supplemental heat source 935 to maintain a target temperature for the air being recirculated within the first housing 903 and the second housing 933. Similar to the embodiment described in connection with FIG. 6, the alternate embodiment described in FIG. 12 provides the additional advantage of eliminating the inefficiency associated with periodically switching the heating mode off so that the heat pump system can operate in a defrost mode. Instead of interrupting the heating mode, the heat pump system illustrated in FIGS. 11 and 12 can activate the supplemental heat source 935 to melt ice that has accumulated on the heat exchanger of the outdoor unit 900.

The example embodiments discussed herein provide a heat pump system with improved heating capacity. The example systems described herein can be implemented as a single outdoor system with an outdoor heat exchanger unit combined with a supplemental heating apparatus. Alternatively, the example embodiments can be implemented as a supplemental heating apparatus component that is designed to be attached to a variety of outdoor heat exchanger units. In alternate embodiments, certain components shown in the figures may be removed or reconfigured.

Although the invention is described with reference to example embodiments, it should be appreciated by those skilled in the art that various modifications are well within the scope and spirit of this disclosure. Those skilled in the art will appreciate that the present invention is not limited to any specifically discussed application and that the embodiments described herein are illustrative and not restrictive. From the description of the example embodiments, equivalents of the elements shown therein will suggest themselves to those skilled in the art, and ways of constructing other embodiments will suggest themselves to practitioners of the art. Therefore, the scope of the present disclosure is not limited to the example embodiments provided herein.

What is claimed is:

1. An outdoor unit of a heat pump system comprising:
   a first housing comprising a fan, a heat exchanger coil, and a compressor in fluid communication with the heat exchanger coil; and
   a second housing comprising:
   a supplemental heat source;
   an inlet damper;
   a discharge damper;
   a recirculation damper; and
   a controller configured to manipulate the inlet damper, the discharge damper, and the recirculation damper.

2. The outdoor unit of claim 1, further comprising a temperature sensor, the temperature sensor configured to provide temperature measurements to the controller.

3. The outdoor unit of claim 1, wherein the controller can manipulate each of the inlet damper, the discharge damper, and the recirculation damper into either an open position or a closed position.

4. The outdoor unit of claim 1, wherein the second housing further comprises extension portions for covering inlet openings on the first housing.

5. The outdoor unit of claim 1, wherein the recirculation damper can be angled to direct air exiting the supplemental heat source.

6. The outdoor unit of claim 1, wherein the second housing further comprises a baffle for directing air towards a bottom portion of the second housing.

7. The outdoor unit of claim 1, wherein the supplemental heat source operates in one of an active mode and an inactive mode.

8. The outdoor unit of claim 7, wherein when the supplemental heat source is operating in the active mode, the inlet damper and the discharge damper are in a closed position, the recirculation damper is in an open position, and the supplemental heat source is in a charged state.

9. The outdoor unit of claim 7, wherein when the supplemental heat source operates in the active mode, a temperature within the outdoor unit can be maintained to prevent ice from forming within the outdoor unit.

10. The outdoor unit of claim 7, wherein when the supplemental heat source operates in the active mode, the heat pump system has increased capacity to deliver heat.

11. An apparatus for attaching to an outdoor unit of a heat pump system, the apparatus comprising:
    extension portions for covering inlet openings on the outdoor unit; and
    a housing, the housing comprising:
    a supplemental heat source;
    an inlet damper;
    a discharge damper;
    a recirculation damper; and
    a controller configured to manipulate the inlet damper, the discharge damper, and the recirculation damper.

12. The apparatus of claim 11, further comprising a temperature sensor, the temperature sensor configured to provide temperature measurements to the controller.

13. The apparatus of claim 11, wherein the controller can manipulate each of the inlet damper, the discharge damper, and the recirculation damper into either an open position or a closed position.

14. The apparatus of claim 11, wherein the recirculation damper can be angled to direct air exiting the supplemental heat source.

15. The apparatus of claim 11, wherein the apparatus further comprises a baffle for directing air towards a bottom portion of the housing.

16. The apparatus of claim 11, wherein the apparatus operates in one of an active mode and an inactive mode.

17. The apparatus of claim 16, wherein when the apparatus is operating in the active mode, the inlet damper and the discharge damper are in a closed position, the recirculation damper is in an open position, and the supplemental heat source is in a charged state.

18. The apparatus of claim 16, wherein when the apparatus is operating in the active mode, a temperature within the outdoor unit can be maintained to prevent ice from forming within the outdoor unit.

19. The apparatus of claim 16, wherein when the apparatus operates in the active mode, the heat pump system has increased capacity to deliver heat.

* * * * *